(12) United States Patent
Aso (10) Patent No.: US 10,106,029 B2
(45) Date of Patent: Oct. 23, 2018

(54) FUEL TANK STRUCTURE

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 15/077,190

(22) Filed: Mar. 22, 2016

(65) Prior Publication Data

US 2016/0368374 A1    Dec. 22, 2016

(30) Foreign Application Priority Data

Jun. 16, 2015  (JP) ................... 2015-121260

(51) Int. Cl.
*B60K 15/077*  (2006.01)
*B60K 15/063*  (2006.01)
*B60K 15/03*   (2006.01)

(52) U.S. Cl.
CPC .... *B60K 15/03* (2013.01); *B60K 2015/03078* (2013.01); *B60K 2015/03085* (2013.01)

(58) Field of Classification Search
CPC .......... B60K 15/03; B60K 2015/03078; B60K 2015/03085; B60K 2015/03072; G01N 25/00
USPC .......................... 220/562, 720, 227; 123/516
See application file for complete search history.

(56) References Cited

U.S. PATENT DOCUMENTS

| 3,693,825 | A | * | 9/1972 | Richman | B60K 15/03504 220/227 |
| 4,651,889 | A | | 3/1987 | Uranishi et al. | |
| 4,880,135 | A | * | 11/1989 | Neou | B65D 88/62 220/216 |
| 5,596,971 | A | | 1/1997 | Kidokoro | |
| 5,746,185 | A | * | 5/1998 | Kidokoro | B60K 15/03 123/516 |
| 5,746,186 | A | * | 5/1998 | Kidokoro | B60K 15/03 123/516 |
| 5,887,616 | A | | 3/1999 | Ikeda et al. | |
| 5,925,817 | A | * | 7/1999 | Kidokoro | B60K 15/03 73/40 |
| 5,975,331 | A | * | 11/1999 | Ishikawa | B60K 15/03 220/530 |
| 5,979,417 | A | | 11/1999 | Hyodo et al. | |

(Continued)

FOREIGN PATENT DOCUMENTS

JP    S60-199730 A    10/1985
JP    S64-16426 A      1/1989

(Continued)

*Primary Examiner* — Andrew Perreault
(74) *Attorney, Agent, or Firm* — Oliff PLC (57) ABSTRACT

A fuel tank structure includes: a fuel tank that is installed in an automobile and that accommodates fuel; a bag-shaped member that is fixed to a ceiling portion of an interior of the fuel tank, and that can inflate and deflate; and a supporting plate that is provided at the bag-shaped member at a position facing a bottom portion of the fuel tank, the supporting plate having a specific gravity that is lower than a specific gravity of the fuel and causing the bag-shaped member to inflate toward the bottom portion of the fuel tank due to a weight of the supporting plate.

4 Claims, 9 Drawing Sheets

(56) References Cited

U.S. PATENT DOCUMENTS

| | | | | |
|---|---|---|---|---|
| 5,979,481 A | * | 11/1999 | Ayresman | ............... B60K 15/03 137/14 |
| 9,783,043 B2 | * | 10/2017 | Aso | ........................ B60K 15/03 |
| 9,834,089 B2 | * | 12/2017 | Aso | ........................ B60K 15/03 |
| 2015/0151629 A1 | * | 6/2015 | Ooiwa | ............. B60K 15/03006 220/562 |
| 2016/0361992 A1 | * | 12/2016 | Aso | ........................ B60K 15/03 |

FOREIGN PATENT DOCUMENTS

| | | |
|---|---|---|
| JP | H08-170568 A | 7/1996 |
| JP | H11-11167 A | 1/1999 |

* cited by examiner

FUEL TANK STRUCTURE

CROSS-REFERENCE TO RELATED APPLICATION

This application claims priority under 35 USC 119 from Japanese Patent Application No. 2015-121260 filed Jun. 16, 2015, the disclosure of which is incorporated by reference herein.

BACKGROUND

Technical Field

The present invention relates to a fuel tank structure.

Related Art

A fuel tank structure, in which an expanding/contracting film that is bag-shaped (a bag-shaped member) that can inflate and deflate is provided within a fuel tank, is disclosed in Japanese Patent Application Laid-Open (JP-A) No. H8-170568 as a fuel tank structure that is installed in an automobile. Further, this JP-A No. H8-170568 discloses a technique of suppressing the generation of evaporated fuel from the liquid surface of the fuel by inflating or deflating the expanding/deflating film so as to cover the liquid surface of the fuel.

SUMMARY

However, in the technique disclosed in the above-described document, compressed air must be sent from a compressor at the time of inflating the bag-shaped member, and a valve for opening to the atmosphere must be opened at the time of deflating the bag-shaped member. Namely, the compressor must be operated or stopped, and the valve for opening to the atmosphere must be opened or closed, in accordance with the height of the liquid surface of the fuel. It is difficult to inflate and deflate the bag-shaped member so as to follow the height of the liquid surface of the fuel.

In view of the above-described circumstances, an object of the present invention is to provide a fuel tank structure that can inflate and deflate a bag-shaped member following the height of the liquid surface of fuel.

A fuel tank structure of a first aspect includes: a fuel tank that is installed in an automobile and that accommodates fuel; a bag-shaped member that is fixed to a ceiling portion of an interior of the fuel tank, and that can inflate and deflate; and a supporting plate that is provided at the bag-shaped member at a position facing a bottom portion of the fuel tank, the supporting plate having a specific gravity that is lower than a specific gravity of the fuel and causing the bag-shaped member to inflate toward the bottom portion of the fuel tank due to a weight of the supporting plate.

In the fuel tank structure of the first aspect, the bag-shaped member that can inflate and deflate is fixed to the ceiling portion of the fuel tank interior. Further, the supporting plate is provided at this bag-shaped member. Here, the supporting plate is provided at a position of the bag-shaped member which position faces the bottom portion of the fuel tank, and is formed of a material whose specific gravity is lower than that of fuel. Due thereto, the supporting plate floats in the fuel, and therefore, as the liquid surface of the fuel that is accommodated in the fuel tank becomes high, the supporting plate moves toward the ceiling portion side and can cause the bag-shaped member to deflate. Further, the supporting plate can cause the bag-shaped member to inflate toward the bottom portion side due to the weight of the supporting plate itself. Namely, as the liquid surface of the fuel that is accommodated in the fuel tank becomes low, the supporting plate moves toward the bottom portion side and causes the bag-shaped member to inflate toward the bottom portion side.

In a fuel tank structure of a second aspect, in the first aspect, bulging portions, that bulge out toward the bottom portion of the fuel tank, are provided at an outer peripheral portion of the supporting plate.

In the fuel tank structure of the second aspect, the buoyancy, that is applied to the bulging portions from the fuel in a state in which the supporting plate is floating at the liquid surface of the fuel, is greater than the buoyancy that is applied to the general portion. Due thereto, the supporting plate tilting and sinking in the fuel is suppressed, and the posture of the supporting plate can be stabilized.

In a fuel tank structure of a third aspect, in the first aspect or the second aspect, cavity portions that receive a gas are provided along an outer peripheral portion of the supporting plate.

In the fuel tank structure of the third aspect, because buoyancy is applied to the cavity portions, the supporting plate tilting and sinking in the fuel is suppressed, and the posture of the supporting plate can be stabilized.

In a fuel tank structure of a fourth aspect, in any one aspect of the first through third aspects, urging members that urge the supporting plate toward the bottom portion of the fuel tank, by an urging force that is lower than a pressure of the fuel on the supporting plate.

In the fuel tank structure of the fourth aspect, because the supporting plate is urged toward the bottom portion side by the urging members, the supporting plate can be stably pushed against the liquid surface of the fuel. Further, because the urging force that is applied to the supporting plate from the urging members is lower than the force that the supporting plate receives from the fuel, the supporting plate sinking in the fuel can be suppressed.

As described above, in accordance with the fuel tank structure of the first aspect, there is the excellent effect that the bag-shaped member can be inflated or deflated following the height of the liquid surface of the fuel.

In accordance with the fuel tank structures of the second aspect and the third aspect, there is the excellent effect that the state of contact of the liquid surface of the fuel and the supporting plate can be maintained good.

In accordance with the fuel tank structure of the fourth aspect, there is the excellent effect that the bag-shaped member can be stably inflated toward the bottom portion side of the fuel tank, as compared with a structure in which the bag-shaped member is made to inflate by the weight of the supporting plate.

BRIEF DESCRIPTION OF THE DRAWINGS

Embodiments of the present invention will be described in detail based on the following figures, wherein.

DETAILED DESCRIPTION

First Embodiment

A fuel tank structure relating to a first embodiment is described hereinafter with reference to FIG. 1 through FIG. 5. Note that arrow UP that is shown appropriately in the respective drawings indicates the upper side of a fuel tank. Further, in the present embodiment, the upper side of the fuel tank and the upper side in the vehicle vertical direction coincide with one another.

Figure 1:
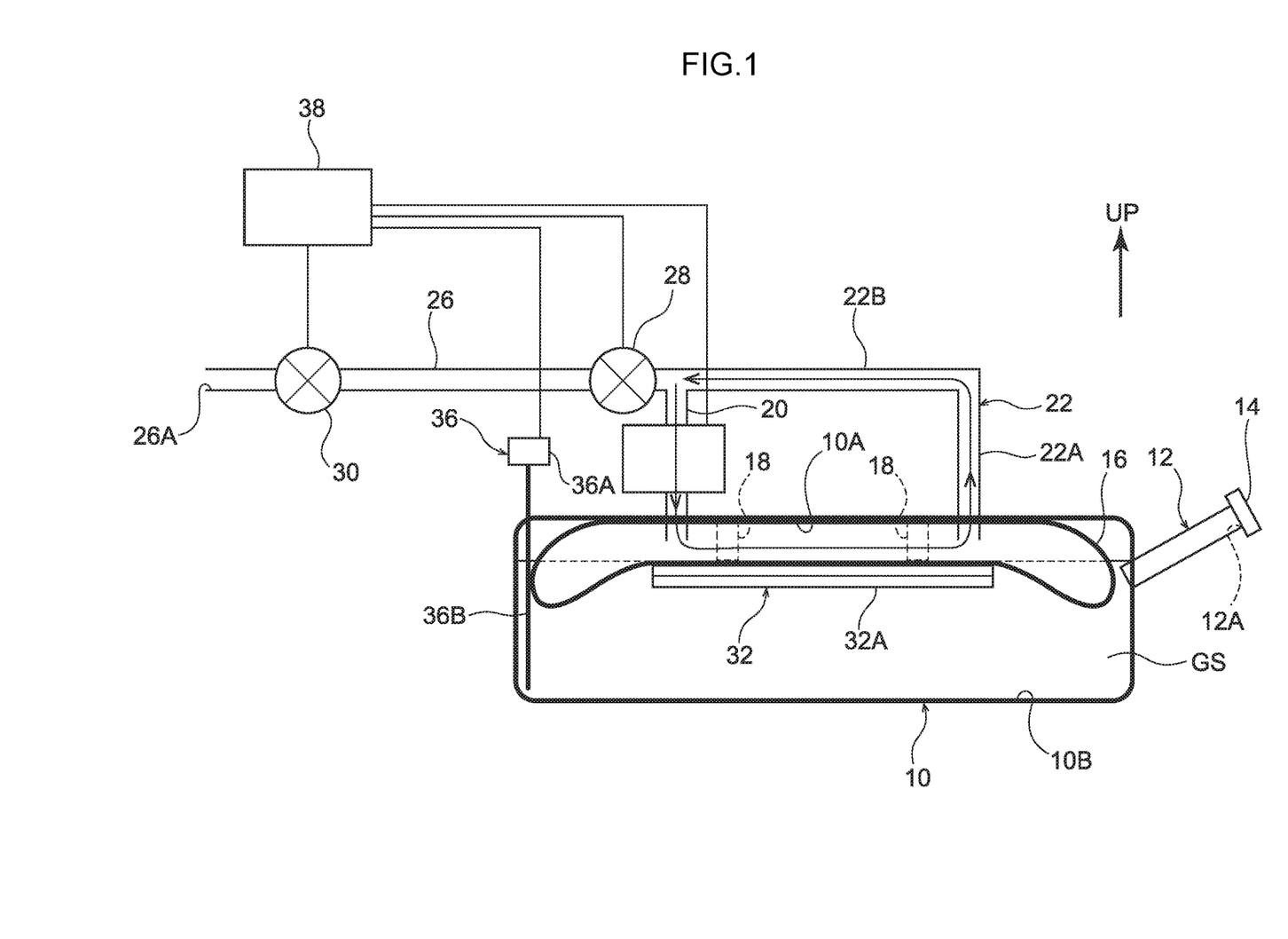
FIG. 1 is a drawing that schematically shows the overall structure of a fuel tank structure relating to a first embodiment.

As shown in FIG. 1, a fuel tank 10, that structures the fuel tank structure relating to the present embodiment, is formed in a hollow shape, and is formed in a shape (e.g., the shape of a substantially parallelepiped box) that can accommodate liquid fuel (hereinafter called "fuel GS") in the interior thereof. Further, the lower surface of the fuel tank 10 is supported by an unillustrated tank band. The fuel tank 10 is mounted to an unillustrated floor panel due to this tank band being fixed to the floor panel via brackets or the like.

A filler pipe 12 that is substantially tubular is connected to the fuel tank 10. A refueling port 12A is formed in the upper end portion of the filler pipe 12. Refueling is carried out due to a refueling gun being inserted into this refueling port 12A and the fuel GS being filled into the fuel tank 10. Note that this is a structure in which, in a case in which there is a large amount of the fuel GS within the fuel tank 10, some of the fuel GS is accommodated in the filler pipe 12 as well.

The refueling port 12A at the upper end of the filler pipe 12 is opened and closed by a fuel cap 14. An unillustrated fuel lid, that is provided at a side panel or the like of the vehicle body, is disposed at the outer side of the fuel cap 14.

In the closed state, the fuel cap 14 closes-off the refueling port 12A, and limits access of a refueling gun to the filler pipe 12. In contrast, when the fuel cap 14 is opened, the refueling port 12A of the filler pipe 12 is opened, and access of a refueling gun to the refueling path is possible.

A bag-shaped member 16 and contraction limiting members 18 are provided at the vehicle upper side of the fuel tank 10 interior. The bag-shaped member 16 is formed of a resin material that is inflatable and contractible, and is fixed to a ceiling portion 10A of the fuel tank 10. Further, a supporting plate 32 is provided at the fuel tank 10. Details of the supporting plate 32 are described later. Note that "inflatable and contractible" here is not limited to a structure in which the bag-shaped member 16 itself expands and contracts, and includes members that are bag-shaped and whose volumes are variable such that they contract by being folded-up and inflate by being unfolded.

The contraction limiting members 18 are provided at the region between an introducing pipe 20 and a lead-out pipe 22, and project-out downwardly from the ceiling portion 10A of the fuel tank 10. Further, this is a structure in which the contraction limiting members 18 contact the bag-shaped member 16 in a state in which the fuel GS has been filled-in up to the full-tank liquid level. Due thereto, the bag-shaped member 16 does not contract further at least at the region between the introducing pipe 20 and the lead-out pipe 22.

A detection portion 36B of a temperature sensor 36 is disposed in a vicinity of an inner wall of the fuel tank 10 interior. The temperature sensor 36 is structured to include a main body portion 36A that is disposed at the outer side of the fuel tank 10, and the detection portion 36B that is rod-shaped and that extends downward from the main body portion 36A. Further, the detection portion 36B extends along the inner wall of the fuel tank 10 to a bottom portion, and this is a structure in which the temperature of the fuel GS that is accommodated within the fuel tank 10 can be sensed by the detection portion 36B.

The introducing pipe 20 is connected to the ceiling portion 10A of the fuel tank 10. The introducing pipe 20 is a pipe body for introducing air into the bag-shaped member 16 that is described later, and extends in the vertical direction. Further, the lower end portion of the introducing pipe 20 is disposed within the fuel tank 10. On the other hand, the upper end portion of the introducing pipe 20 is connected to a cooling wind introducing section 24, and extends further above the cooling wind introducing section 24 and is connected to the lead-out pipe 22.

The cooling wind introducing section 24 that is connected to the introducing pipe 20 is equipped with an unillustrated Peltier element, and is structured so as to, by this Peltier element, cool the air that flows through the interior of the introducing pipe 20.

The lead-out pipe 22 is connected to the ceiling portion 10A of the fuel tank 10, with an interval between the lead-out pipe 22 and the introducing pipe 20. The lead-out pipe 22 is a pipe body that leads air out from the bag-shaped member 16, and is structured to include a vertical portion 22A that extends in the vertical direction and a lateral portion 22B that extends substantially horizontally. The lower end portion of the vertical portion 22A is disposed within the fuel tank 10. On the other hand, the upper end portion of the vertical portion 22A is connected to one end portion of the lateral portion 22B. Further, the other end portion of the lateral portion 22B is connected to the upper end portion of the introducing pipe 20.

Here, one end portion of a pipe 26 for opening to the atmosphere is connected to the portion where the introducing pipe 20 and the lead-out pipe 22 are connected. The pipe 26 for opening to the atmosphere extends in a direction of continuing with the lateral portion 22B of the lead-out pipe 22. An opening 26A that opens to the atmosphere is formed at the other end portion of the pipe 26 for opening to the atmosphere. Further, an opening/closing valve 28 and a pressure adjusting valve 30 are provided at the one end side and the other end side, respectively, of the pipe 26 for opening to the atmosphere.

The opening/closing valve 28 is provided in a vicinity of the connected portion of the introducing pipe 20 and the lead-out pipe 22. This is a structure in which, due to the opening/closing valve 28 opening and closing, the entry and exit of air between, on the one hand, the pipe 26 for opening to the atmosphere, and, on the other hand, the introducing pipe 20 and the lead-out pipe 22, can be adjusted.

The pressure adjusting valve 30 is provided in a vicinity of the opening 26A. Further, this is a structure in which, due to the pressure adjusting valve 30 being opened, air within the pipe 26 for opening to the atmosphere is discharged-out into the atmosphere, and the pressure of the pipe 26 for opening to the atmosphere can be adjusted. Note that, in a case in which the opening/closing valve 28 is open, air within the fuel tank 10 is discharged-out into the atmosphere.

Here, the temperature sensor 36, the opening/closing valve 28, the pressure adjusting valve 30, and the cooling wind introducing section 24 are electrically connected to an ECU (Electronic Control Unit) 38 that is a control section, and are controlled by the ECU 38. Concretely, in a case in which the temperature of the fuel GS that is sensed by the temperature sensor 36 becomes higher than a predetermined temperature (e.g., 30° C.), a signal is transmitted from the ECU 38 to the cooling wind introducing section 24, and the cooling wind introducing section 24 is operated. At this time, the cooling wind introducing section 24 operates regardless of the state of the bag-shaped member 16. Namely, the cooling wind introducing section 24 operates regardless of whether the bag-shaped member 16 is deflated or inflated.

Due to the cooling wind introducing section 24 operating, the air that flows within the introducing pipe 20 is cooled and becomes cooling wind and is introduced into the bag-shaped member 16. Then, due to convection, the low-temperature air that has been introduced into the bag-shaped member 16 falls and moves along the inner surface of the bag-shaped member 16. Here, because the bag-shaped member 16 and the liquid surface of the fuel GS contact one another, the cooling wind flows in the direction of the arrows at the interior of the bag-shaped member 16 while taking heat away from the fuel GS.

Further, the temperature of the cooling wind becomes high due to the cooling wind taking heat away from the fuel GS. Then, the air, that rises as the temperature becomes high and that reaches a vicinity of the lead-out pipe 22, passes-through the lead-out pipe 22 and reaches the portion connected with the introducing pipe 20. Here, because the opening/closing valve 28 is closed by the ECU 38, high-temperature air flows from the lead-out pipe 22 into the introducing pipe 20, and again passes-through the cooling wind introducing section 24 and is cooled. In this way, due to the air of the introducing pipe 20 being cooled and being circulated, the heat at the interior of the fuel tank 10 is taken, and the temperature is lowered. Further, when the temperature of the fuel GS that is sensed by the temperature sensor 36 becomes lower than the predetermined temperature, the cooling wind introducing section 24 is stopped by the ECU 38. Further, the opening/closing valve 28 is opened. Note that there may be a structure in which the cooling wind introducing section 24 is not provided.

(Structure of Supporting Plate 32)

Figure 4:
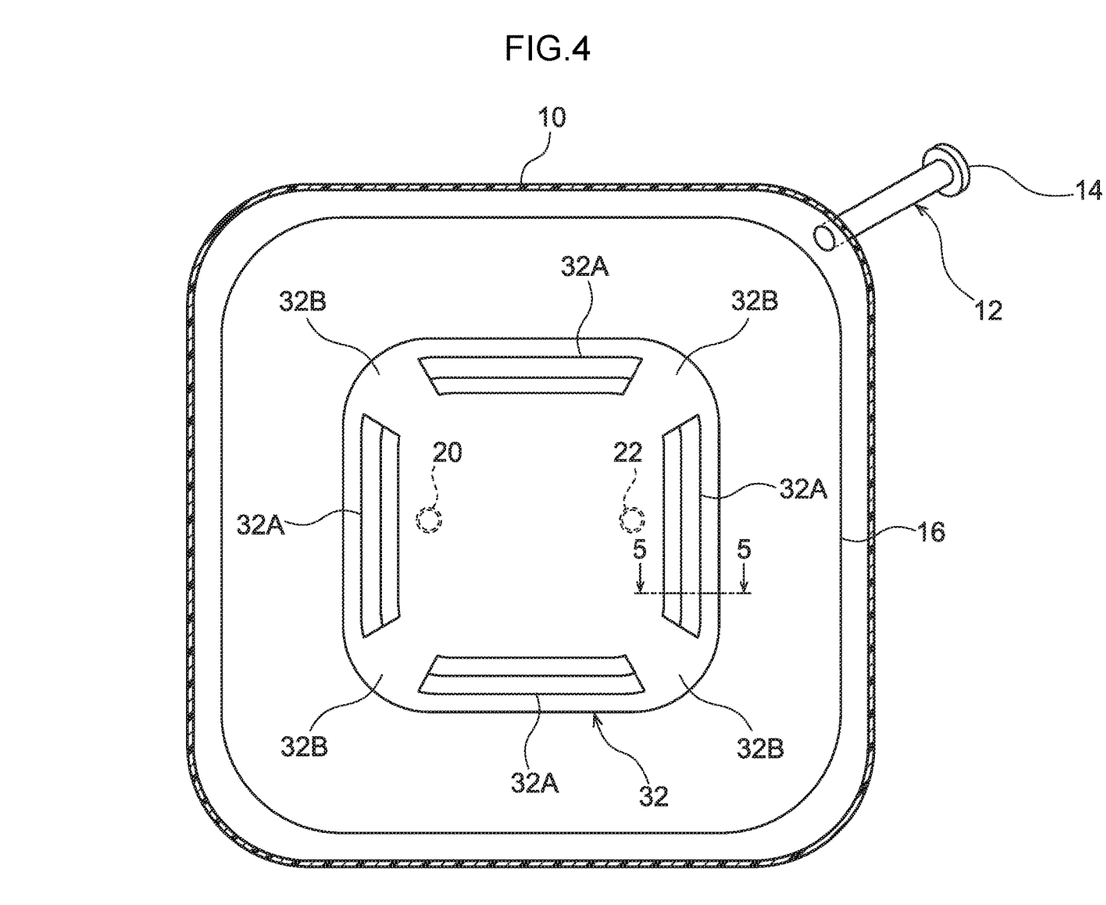
FIG. 4 is a cross-sectional view showing the state cut along line 4-4 of FIG. 2.

The supporting plate 32 is described next. The supporting plate 32 is provided at the bag-shaped member 16, at a position facing a bottom portion 10B of the fuel tank 10. Further, as shown in FIG. 4, the supporting plate 32 is disposed at the central portion of the bag-shaped member 16, and is formed in a substantially rectangular shape when viewed from the bottom portion 10B side of the fuel tank 10.

Here, the supporting plate 32 is formed from a thermoplastic resin whose specific gravity is lower than that of fuel, and is structured so as to float in the fuel GS. In the present embodiment, as an example, the supporting plate 32 is formed of a material whose main component is polyethylene. Note that the supporting plate is not limited to this, and may be formed of a material whose main component is polypropylene or polyacetal or the like.

Bulging portions 32A that bulge-out toward the bottom portion 10B side (the lower side) are formed at the outer peripheral portion of the supporting plate 32. The bulging portions 32A are formed along the outer peripheral portion of the supporting plate 32, and, in the present embodiment, the bulging portions 32A are formed at the respective sides that structure the supporting plate 32. Further, the bulging portions 32A are not formed at the corner portions of the supporting plate 32, and these corner portions are flow-in portions 32B for the fuel GS to flow-in.

Figure 5:
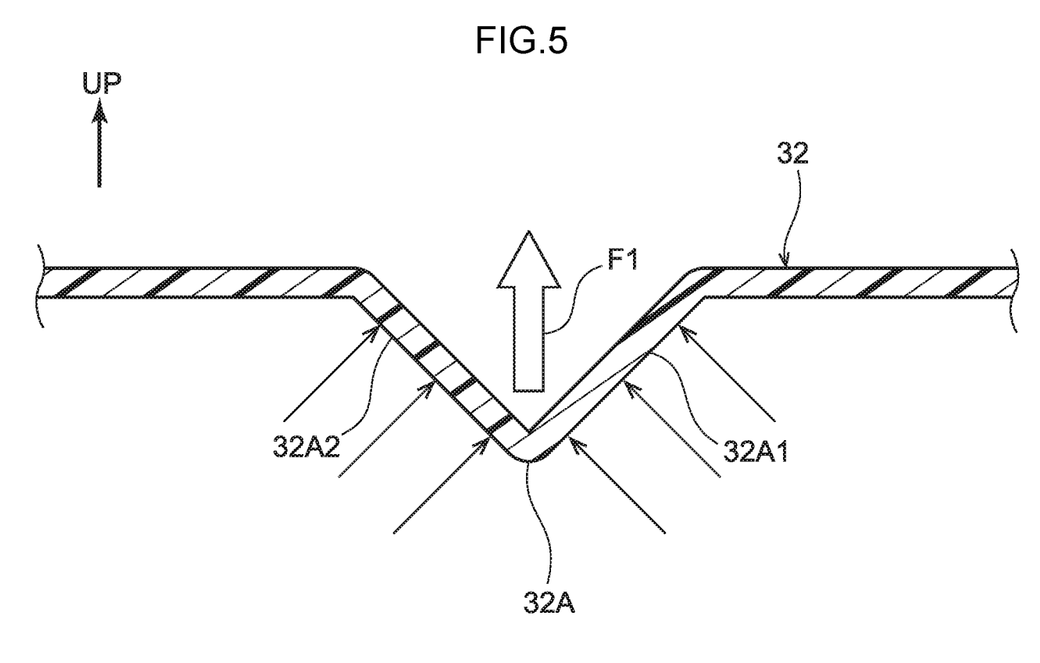
FIG. 5 is an enlarged sectional view showing, in an enlarged manner, the state cut along line 5-5 of FIG. 4.

As shown in FIG. 5, the bulging portion 32A is structured by a pair of inclined surfaces 32A1, 32A2, and the cross-sectional shape, that is cut in the direction orthogonal to the extending direction of the bulging portion 32A, is formed in a substantial V-shape. Therefore, in the state in which the supporting plate 32 is floating in the fuel GS, the bulging portions 32A are positioned further toward the bottom portion 10B side of the fuel tank 10 than the general portion, and pressure is applied from the fuel GS to the respective inclined surfaces that structure the bulging portions 32A. Further, the resultant force of the pressure that is applied from the fuel GS is buoyancy F1 that is directed upward.

Figure 2:
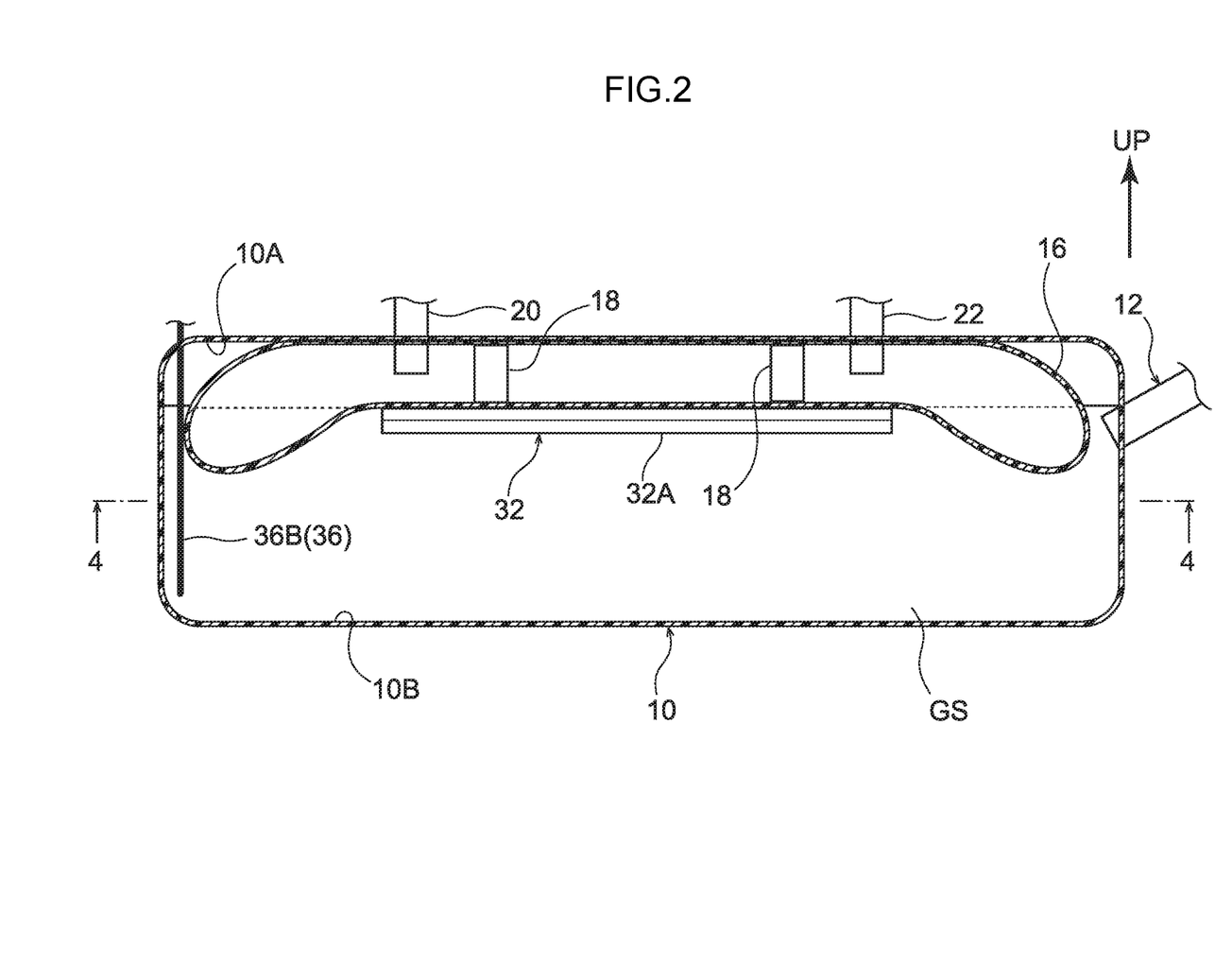
FIG. 2 is a cross-sectional view showing main portions of the fuel tank structure relating to the first embodiment, and is a drawing showing a state in which a bag-shaped member is deflated.

As shown in FIG. 2, in the state in which a large amount of the fuel GS is accommodated in the fuel tank 10, the bag-shaped member 16 is pushed-up toward the ceiling portion 10A side of the fuel tank 10 by the supporting plate 32 that floats at the liquid surface of the fuel GS. Namely, the bag-shaped member 16 is deflated. Further, in this state, the central portion of the bag-shaped member 16 (the portion that is supported by the supporting plate 32) is in a state of contacting the liquid surface of the fuel GS. Further, the outer peripheral portion of the bag-shaped member 16 is disposed within the fuel GS.

Figure 3:
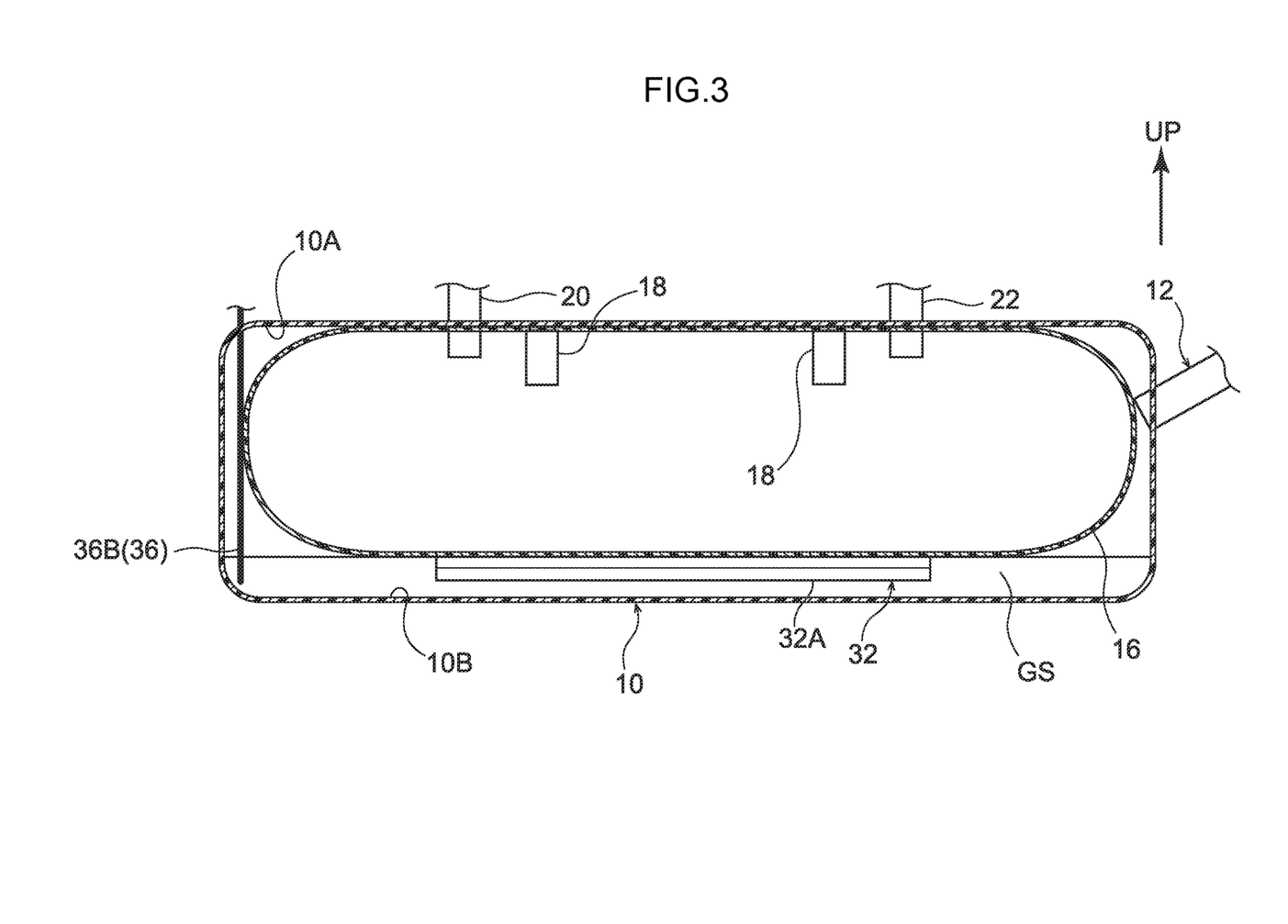
FIG. 3 is a cross-sectional view that corresponds to FIG. 2 and shows a state in which the bag-shaped member is inflated.

On the other hand, as shown in FIG. 3, in a state in which the amount of the fuel GS that is accommodated in the fuel tank 10 is low, the supporting plate 32 moves toward the bottom portion 10B side due to its own weight. Namely, the supporting plate 32 falls following the liquid surface of the fuel GS. Due thereto, the bag-shaped member 16 is inflated toward the lower side. Note that the bag-shaped member 16 inflates downward due to its own weight even in a case in which the supporting plate 32 is not provided, but, by providing the supporting plate 32, the downward load increases more, and the bag-shaped member 16 inflates following the liquid surface of the fuel GS.

(Operation and Effects)

Operation and effects of the fuel tank structure relating to the present embodiment are described next.

In the present embodiment, the supporting plate 32 moves up and down following the height of the liquid surface of the fuel GS that is accommodated within the fuel tank 10. Due thereto, the bag-shaped member 16 is inflated or deflated so as to follow the height of the liquid surface of the fuel GS, and the generation of evaporated fuel from the liquid surface of the fuel GS can be suppressed effectively. Namely, when the liquid surface of the fuel GS rises due to refueling or the like, the supporting plate 32, whose specific gravity is lower than that of the fuel GS, rises following the liquid surface. Due thereto, the bag-shaped member 16 is deflated. On the other hand, when the amount of the fuel GS decreases and the liquid surface falls, the supporting plate 32 falls due to it own weight and following the liquid surface. Due thereto, the bag-shaped member 16 is inflated toward the lower side. In this way, the bag-shaped member 16 is inflated or deflated by the supporting plate 32, and generation of evaporated fuel from the liquid surface of the fuel GS can be suppressed effectively.

Further, because the present embodiment is structured such that the bag-shaped member 16 is inflated due to the weight of the supporting plate 32, equipment such as a compressor or the like, that is used in a structure that inflates the bag-shaped member 16 by compressed air, is not needed. As a result, simplification of the structure and a lowering of costs can be devised. Further, there is no need for electric power for operating a compressor, and the amount of energy that is consumed can be lowered.

Moreover, in the present embodiment, as shown in FIG. 4, because the bulging portions 32A are formed along the outer peripheral portion of the supporting plate 32, greater buoyancy acts on the outer peripheral portion of the supporting plate 32, and the supporting plate 32 tilting and sinking is suppressed. Namely, the posture of the supporting plate 32 can be stabilized, and the state of contact of the liquid surface of the fuel GS and the supporting plate 32 can be maintained good. In particular, in the present embodiment, because the bulging portions 32A are formed uniformly at the respective sides of the supporting plate 32, buoyancy can be applied uniformly to the supporting plate 32, and the posture of the supporting plate 32 can be maintained good.

Further, in the present embodiment, the flow-in portions 32B are provided between the bulging portions 32A that are adjacent to one another. Due thereto, for example, at the time of carrying out refueling in a state in which the fuel GS within the fuel tank 10 has run-out and the supporting plate 32 contacts the bottom portion 10B of the fuel tank 10, the fuel GS can be made to flow-in from the flow-in portions 32B to the bottom surface side of the supporting plate 32. Namely, the supporting plate 32 can smoothly be made to float in the fuel GS.

Note that, in the present embodiment, the bulging portions 32A that are V-shaped in cross-section are formed along the outer peripheral portion of the supporting plate 32, but the bulging portions are not limited to this and may made to be another shape. For example, bulging portions that are arc-shaped in cross-section may be formed. Further, a structure that applies buoyancy to the supporting plate 32, other than the bulging portions 32A, may be employed. For example, as in the modified example illustrated in FIG. 6, a structure in which cavity forming portions 40 are formed instead of the bulging portions 32A may be employed.

(Modified Example)

Figure 6:
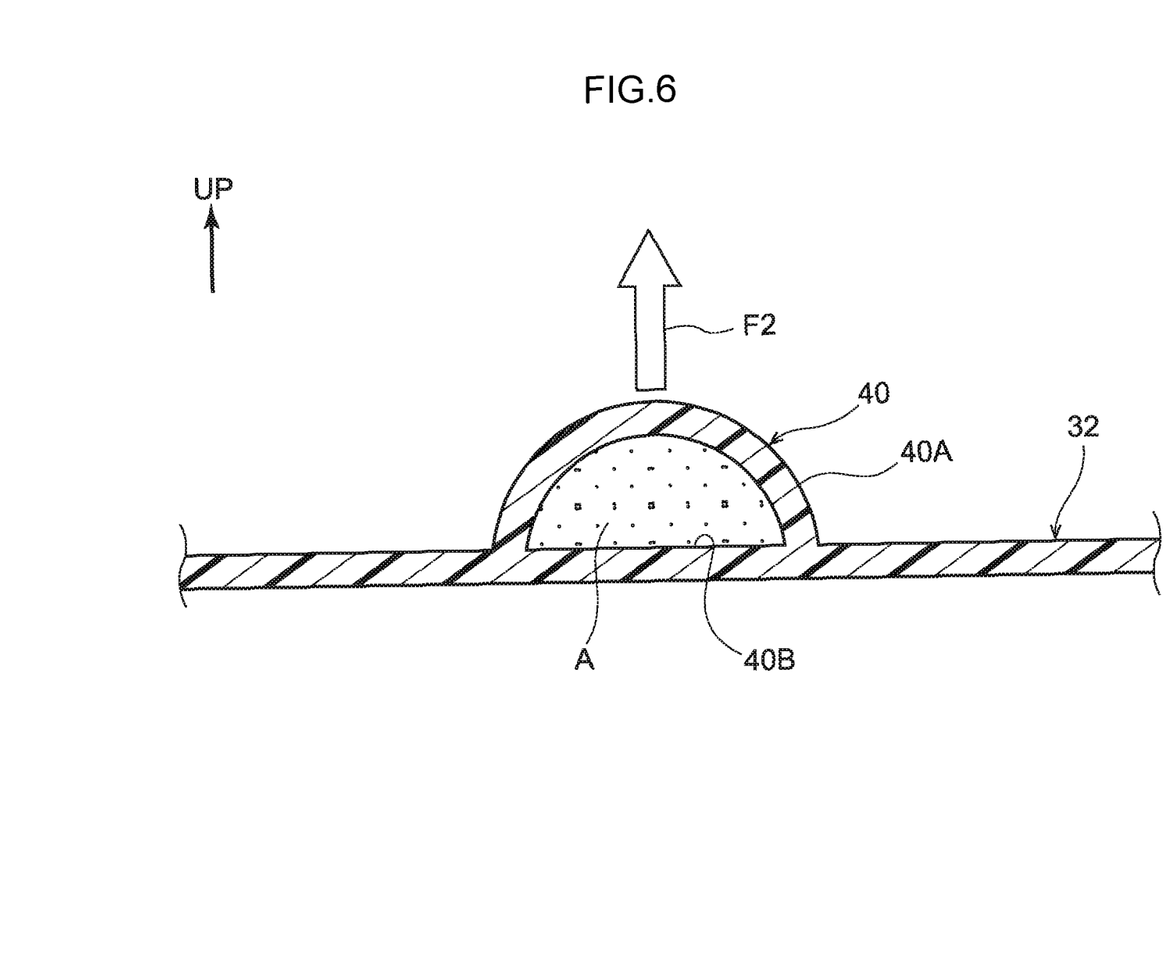
FIG. 6 is a cross-sectional view that corresponds to FIG. 5 and shows a modified example of the fuel tank structure relating to the first embodiment.

As shown in FIG. 6, in the present modified example, the cavity forming portions 40 are formed along the outer peripheral portion of the supporting plate 32. The cavity forming portions 40 are made to be closed cross-sectional structures, whose cross-sections are substantially semicircular due to arc-shaped portions 40A that are substantially arc-shaped and whose upper sides are convex, and form cavity portions 40B. Further, a gas is filled into the cavity portions 40B. Note that, in the present embodiment, air A is filled into the cavity portions 40B as an example of the gas, but the gas is not limited to this.

In the present modified example, buoyancy F2 is applied to the outer peripheral portion of the supporting plate 32 by the cavity forming portions 40. Namely, buoyancy F2 is applied in the same way as a structure in which a float is mounted to the supporting plate 32. Due thereto, the supporting plate 32 tilting and sinking can be suppressed. As a result, the posture of the supporting plate 32 can be stabilized, and the state of contact of the liquid surface of the fuel GS and the supporting plate 32 can be maintained good.

Note that, in the present modified example, the cavity forming portions 40 are provided at the upper surface side of the supporting plate 32, but are not limited to this, and the cavity forming portions 40 may be provided at the lower surface side of the supporting plate 32. Further, a structure may be employed in which both the bulging portions 32A that are shown in FIG. 5 and the cavity forming portions 40 that are shown in FIG. 6 are formed.

Second Embodiment

A fuel tank structure relating to a second embodiment is described next with reference to FIGS. 7 through 9. Note that structures that are similar to those of the first embodiment are denoted by the same reference numerals, and description thereof is omitted as appropriate.

Figure 7:
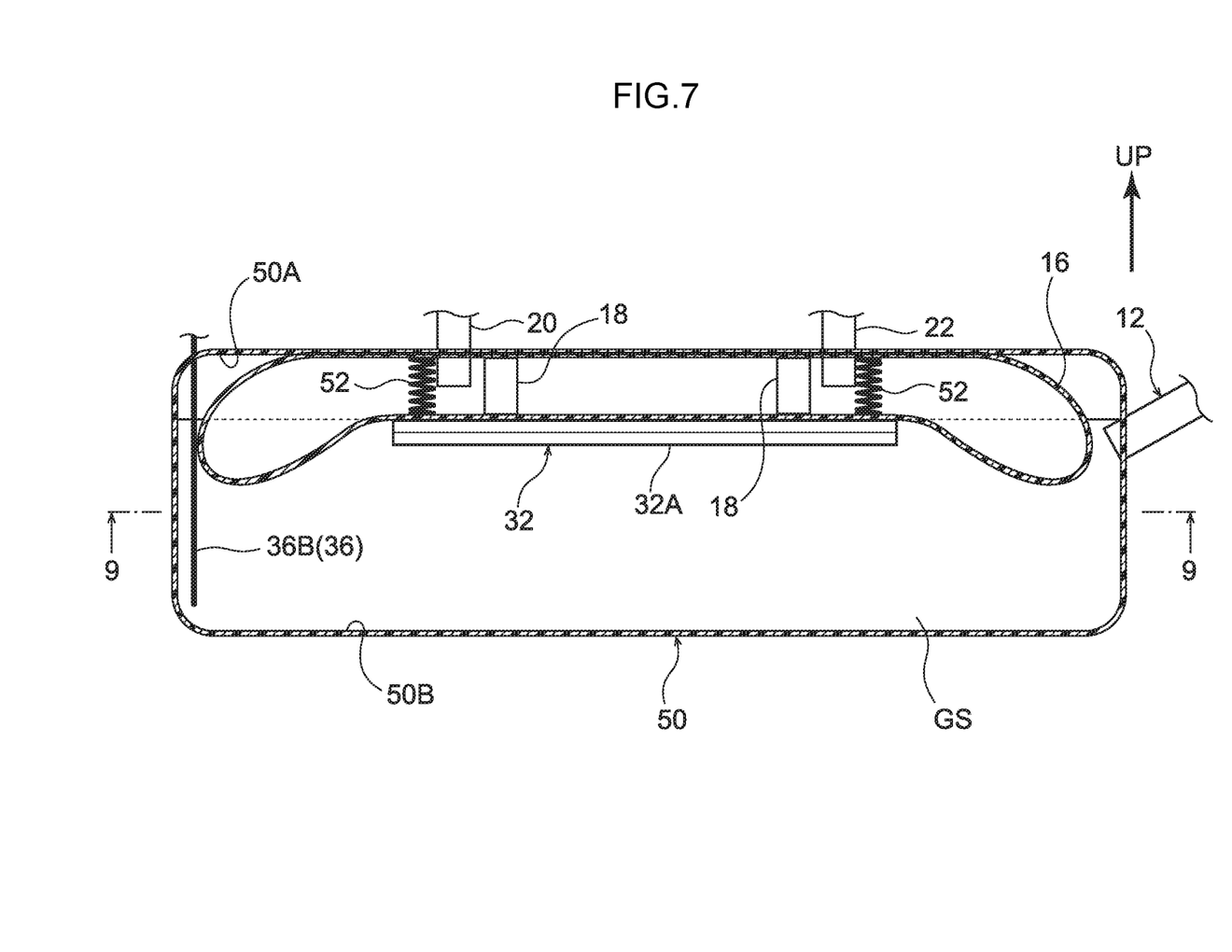
FIG. 7 is a cross-sectional view showing main portions of a fuel tank structure relating to a second embodiment, and is a drawing showing a state in which the bag-shaped member is deflated.

As shown in FIG. 7, in the fuel tank structure relating to the present embodiment, a ceiling portion 50A of a fuel tank 50 and the supporting plate 32 are connected by compression coil springs 52 that serve as urging members. As shown in FIG. 9, in the present embodiment, four of the compression coil springs 52 are provided, and the respective compression coil springs 52 are disposed at the corner portions at which the flow-in portions 32B of the supporting plate 32 are provided.

Here, the urging force of the compression coil springs 52 is set to be lower than the pressure that the supporting plate 32 receives from the fuel GS. Therefore, as shown in FIG. 7, the supporting plate 32 does not sink into the fuel GS, and floats at the liquid surface of the fuel GS and supports the bag-shaped member 16.

Figure 8:
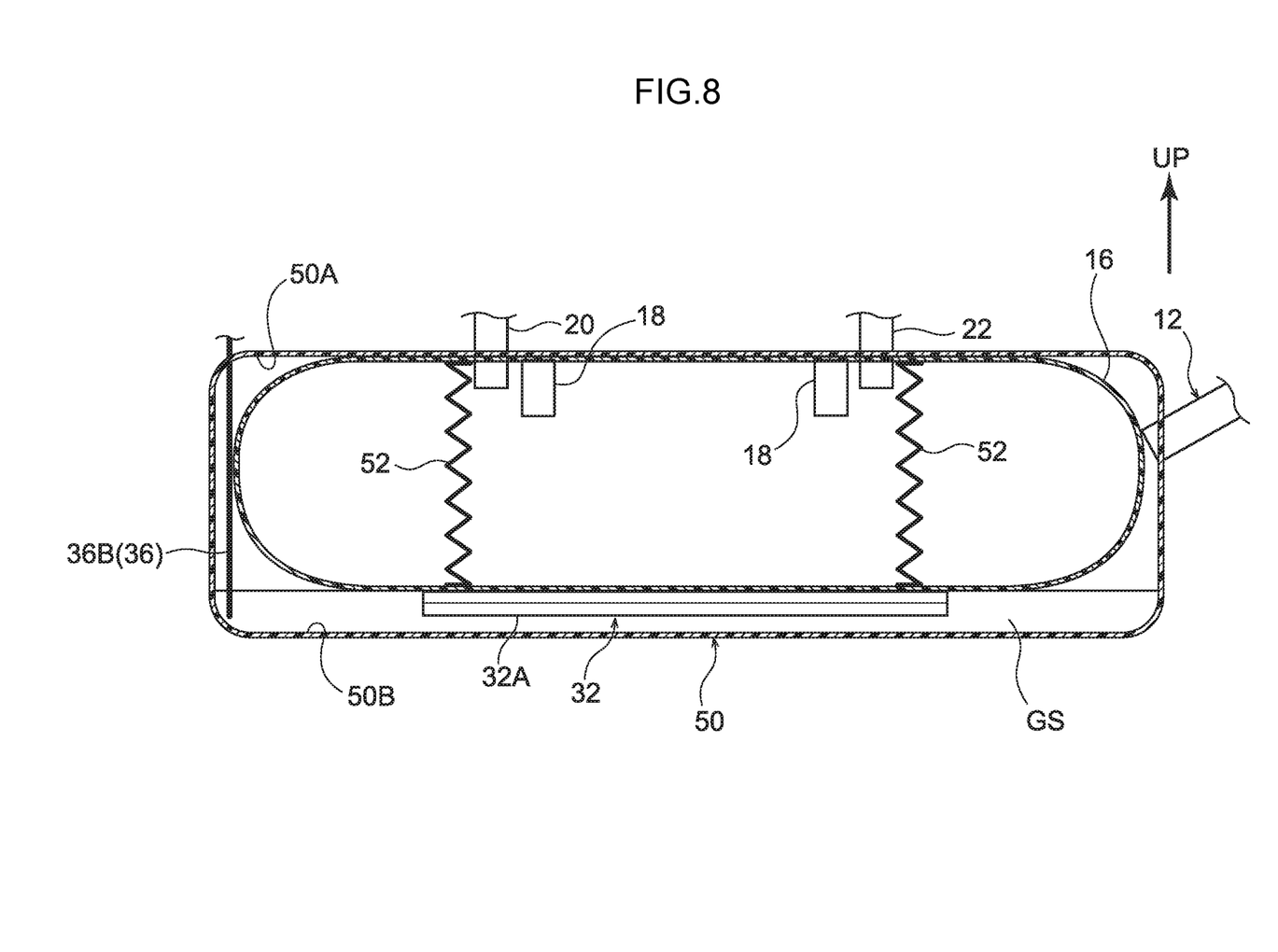
FIG. 8 is a cross-sectional view that corresponds to FIG. 7 and shows a state in which the bag-shaped member is inflated.
Figure 9:
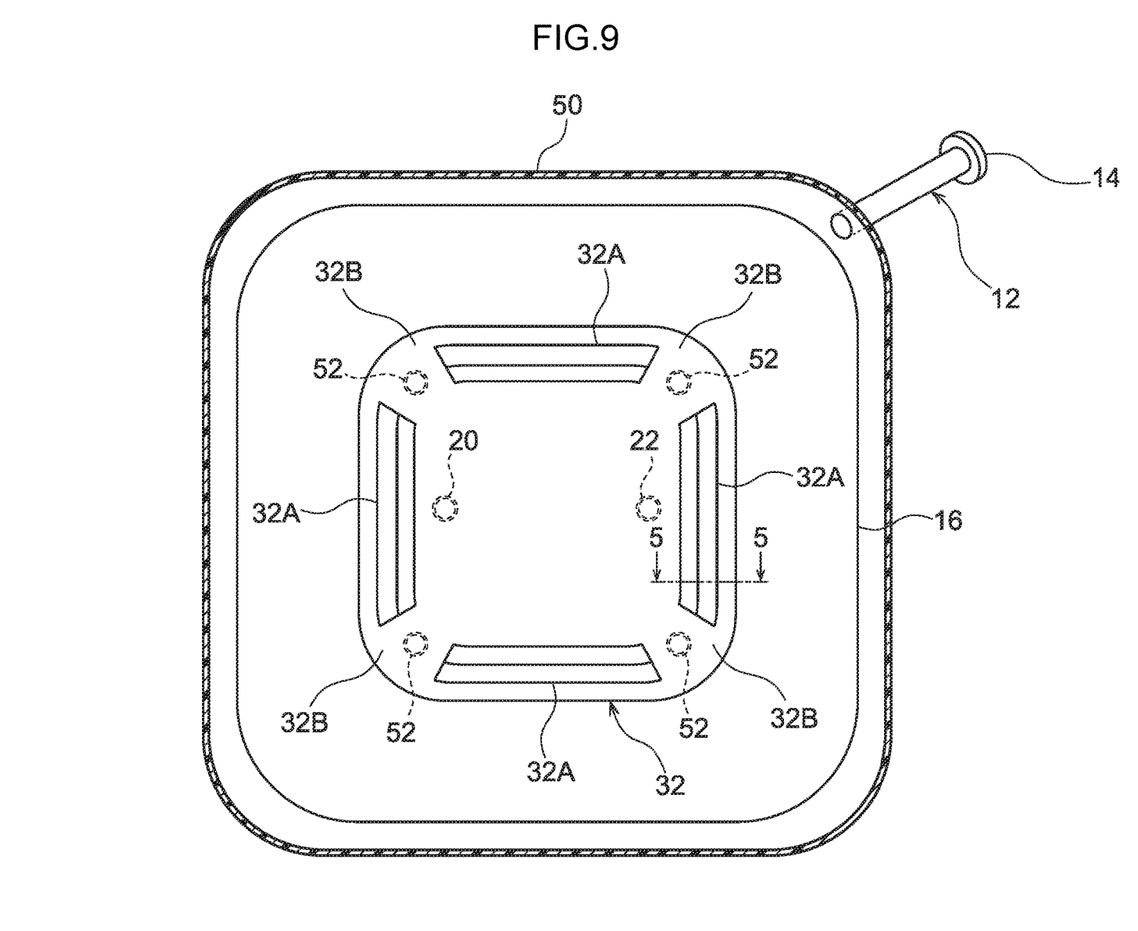
FIG. 9 is a cross-sectional view showing the state cut along line 9-9 of FIG. 7.

On the other hand, as shown in FIG. 8, when the amount of the fuel GS within the fuel tank 50 decreases and the liquid surface falls, the supporting plate 32 moves toward a bottom portion 50B side due to the weight of the supporting plate 32 itself and the urging force from the compression coil springs 52. Namely, the supporting plate 32 falls following the height of the liquid surface of the fuel GS.

(Operation and Effects)

Operation and effects of the fuel tank structure relating to the present embodiment are described next.

In the present embodiment, due to the supporting plate 32 being urged toward the bottom portion 50B side of the fuel tank 50 by the compression coil springs 52, the supporting plate 32 can be stably pushed against the liquid surface of the fuel GS. Further, because the urging force that is applied from the compression coil springs 52 to the supporting plate 32 is lower than the force that the supporting plate 32 receives from the fuel GS, the supporting plate 32 sinking into the fuel GS can be suppressed. Other operations are similar to those of the first embodiment.

Note that the present embodiment illustrates and describes a structure in which the compression coil springs 52 are provided as the urging members, but the present invention is not limited to this. For example, there may be a structure in which the bottom portion 50B of the fuel tank 50 and the bottom surface of the supporting plate 32 are connected by tension coil springs. In this case, if the tensile force (urging force) that the supporting plate 32 receives from the torsion coil springs is smaller than the pressure applied from the fuel GS to the supporting plate 32, effects that are similar to those of the present embodiment are obtained.

Although a first embodiment and a second embodiment of the present invention have been described above, the present invention is not limited to the above-described structures and can, of course, be implemented in various forms other than the above-described structures within a scope that does not depart from the gist thereof. For example, the above-described embodiments are structured such that the detecting portion 36B of the temperature sensor 36 extends all the way to the bottom portion of the fuel tank 10 and senses the temperature of the accommodated fuel GS, but embodiments are not limited to this. For example, there may be a structure in which the detecting portion is disposed further upward than the liquid surface of the fuel GS and senses the temperature of evaporated fuel (vapor).

Further, in the above-described embodiments, two of the contraction limiting members 18 are disposed at the interior of the fuel tank 10, but embodiments are not limited to this. For example, three or more of the contraction limiting members 18 may be provided. Further, there may be a structure in which the contraction limiting members 18 are not provided. In this case, by adjusting the height of the liquid surface of the fuel GS at the time when the tank is full, a flow path of air can be ensured at the interior of the bag-shaped member 16 even if the contraction limiting members 18 are not provided.

Moreover, in the above-described embodiments, the bulging portions 32A or the cavity forming portions 40 are formed along the outer peripheral portion of the supporting plate 32, but the region where the bulging portions 32A or the cavity forming portions 40 are formed is not particularly limited. Further, a supporting plate at which the bulging portions 32A or the cavity forming portions 40 are not formed may be used. In this case, effects that are similar to those of the above-described embodiments are obtained if the supporting plate is formed in a shape or of a material that is such that the supporting plate does not sink within the fuel GS.

What is claimed is:

1. A fuel tank assembly comprising:
   a fuel tank configured to store fuel;
   a bag-shaped member fixed, at a first side, to an interior ceiling of the fuel tank, the bag-shaped member containing air and being configured to inflate and deflate; and
   a supporting plate fixed to a second side of the bag-shaped member opposite to the first side of the bag-shaped member, the second side of the bag-shaped member facing an interior bottom of the fuel tank, the supporting plate biasing the second side of the bag-shaped member towards the interior bottom of the fuel tank due to a weight of the supporting plate causing the bag-shaped member to inflate, the supporting plate being configured to move towards the interior bottom of the fuel tank in accordance with a height of the fuel stored in the fuel tank,
   wherein the supporting plate includes bulging portions disposed along a periphery of the supporting plate and extending toward the interior bottom of the fuel tank.

2. The fuel tank assembly of claim 1, wherein cavity portions that receive a gas are provided along an outer periphery of the supporting plate.

3. The fuel tank assembly of claim 1, further comprising urging members that urge the supporting plate toward the interior bottom of the fuel tank by applying an urging force on the supporting plate that is lower than a pressure of the fuel.

4. The fuel tank assembly of claim 1, wherein:
   the supporting plate is composed of a material including at least one of: polyethylene, polypropylene, and polyacetal; and
   the supporting plate has a specific gravity that is lower than a specific gravity of the fuel configured to be stored in the fuel tank.

* * * * *